United States Patent [19]

Osterloff et al.

[11] Patent Number: 4,687,081
[45] Date of Patent: Aug. 18, 1987

[54] LOCKING SYNCHRONIZATION FOR GEAR SHIFT

[75] Inventors: Kurt Osterloff, Friedrichshafen; Gerd Führer, Oberteuringen, both of Fed. Rep. of Germany

[73] Assignee: Zahnradfabrik Friedrichshafen AG, Friedrichshafen, Fed. Rep. of Germany

[21] Appl. No.: 751,741

[22] PCT Filed: Oct. 9, 1984

[86] PCT No.: PCT/EP84/00314
§ 371 Date: Jun. 25, 1985
§ 102(e) Date: Jun. 25, 1985

[87] PCT Pub. No.: WO85/01998
PCT Pub. Date: May 9, 1985

[30] Foreign Application Priority Data

Oct. 26, 1983 [LU] Luxembourg ............ 83110691.9

[51] Int. Cl.[4] ............................................. F16D 23/06
[52] U.S. Cl. ............................................. 192/53 F
[58] Field of Search ............................ 192/53 E, 53 F

[56] References Cited

U.S. PATENT DOCUMENTS

| 2,046,957 | 7/1936 | Manville | 192/53 F |
| 3,355,909 | 12/1967 | Russey et al. | 192/53 F X |
| 3,366,208 | 1/1968 | Kelbel | 192/53 F |
| 4,185,725 | 1/1980 | Maina | 192/53 F |
| 4,271,943 | 6/1981 | Kuzma | 192/53 F |
| 4,349,090 | 9/1982 | Griesser | 192/53 F X |
| 4,413,715 | 11/1983 | Michael et al. | 192/53 F |
| 4,425,990 | 1/1984 | Griesser | 192/53 F X |
| 4,540,074 | 9/1985 | Magg et al. | 192/53 F X |

FOREIGN PATENT DOCUMENTS

| 1164248 | 2/1964 | Fed. Rep. of Germany |
| 1450825 | 6/1969 | Fed. Rep. of Germany |
| 2904063 | 8/1980 | Fed. Rep. of Germany |
| 2915965 | 10/1980 | Fed. Rep. of Germany |
| 3221712 | 12/1983 | Fed. Rep. of Germany |

OTHER PUBLICATIONS

ZF-B-Sperrsynchronisierung—Publication by Zahnradfabrik AG, F42290/R2964-282 (no date).
ZF-B-Lock Synchronizer—Publication (English) by Zahnradfabrik AG, F42290/R2964-283e (no date).

Primary Examiner—Rodney H. Bonck
Assistant Examiner—Richard M. Lorence
Attorney, Agent, or Firm—Karl F. Ross; Herbert Dubno

[57] ABSTRACT

A lock synchronizer for gearing has a sleeve coupled to the synchronizing body which is engaged with a shaft by tiltable pressure pins which can entrain a synchronizing ring toward the gear whose side coupling teeth are engageable with inner coupling teeth of the sleeve. In addition a friction ring is provided in frictional engagement with the synchronizing ring and with face gearing engageable with face gearing of the gear. The friction ring, however, is free to rotate and to shift axially relative to the synchronizing body in both the neutral and fully coupled positions and is rotatably entrained with the gear only when the face gearings mesh.

6 Claims, 5 Drawing Figures

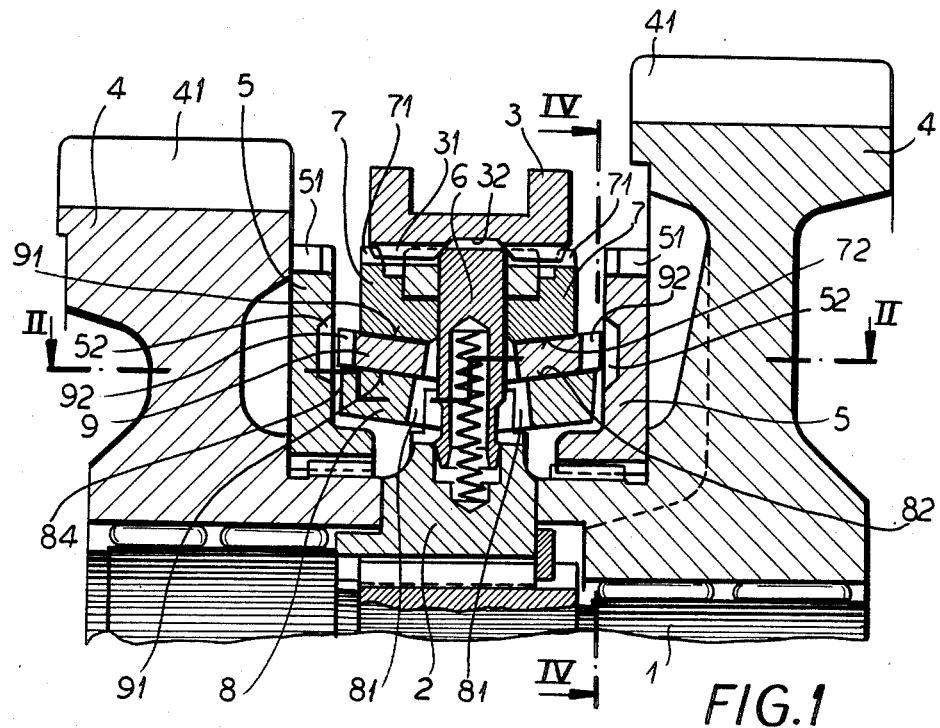
FIG.1
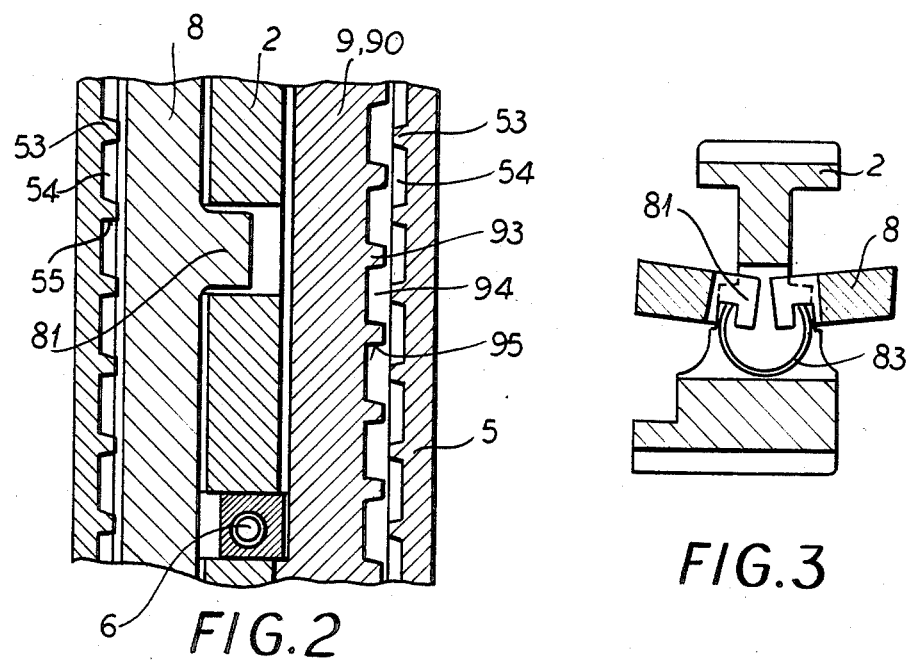
FIG.2
FIG.3

LOCKING SYNCHRONIZATION FOR GEAR SHIFT

CROSS REFERENCE TO RELATED APPLICATIONS

This application is a national phase application of PCT/EP84/00314 filed Oct. 19 1984 and based upon Luxembourg application No. 83 110 691.9 filed Oct. 26 1983.

FIELD OF THE INVENTION

This invention deals with a locking synchronization for a gear shift in which a synchronizing body and a gear rotating at a different speed are connected by means of a ring-shaped axially slideable sliding sleeve are solidly connected when in synchronism, where internal coupling gearing of the sliding sleeve meshes with one each corresponding set of external gearing of the two rotating parts, with locking and/or pressure pins disposed between synchronizing body and sliding sleeve, which in the nonengaged state protrude into a cavity on the interior portion of the sliding sleeve and provide in the radially middle extent axially movable pressure surfaces, which (pressure surfaces) are in effective connection with pressure surfaces on at least one synchronizing ring disposed between synchronizing body and gear, and are in rotary connection in both senses of rotation, with circumferential play, via end stops, where elements which are coordinated with the gear, form at least one solid connection together with elements of at least one synchronizing ring, and where by lack of synchronism the axial movement of the sliding sleeve is prevented by blocking surfaces.

BACKGROUND OF THE INVENTION

Such devices are known e.g. through company memo Zahnradfabrik Friedrichshafen ZF-B- Blocking Synchronization F 42290/R2964-367, the German Patent Nos. 14 50 825 and 29 15 965, and the German Patent document No. 32 21 712.

All these devices have in common that blocking surfaces which are provided on the synchronizing ring or the sliding sleeve prevent full engagement between synchronizing body and gear via the sliding sleeve, until synchronization is attained by means of conically shaped friction surfaces. On the one hand, the friction surfaces are provided on at least one synchronizing ring which is rotatably connected to the synchronizing body with circumferential play; on the other hand they cooperate with the gear which is to be clutched in, or a coupling body on said gear. Such blocking synchronization devices which are applied to modern gear shifting drives, lead to significant simplifications in the shifting of gears, and are built as required especially for gear shifts for heavy duty vehicles, also with amplifying means, for synchronization, see German Patent document No. 32 21 712. All these lack synchronization devices have the common drawback due to the necessary actuating clearance between friction surfaces which are constructed with an angle of more than 10°, they have large axial dimension. If there is more than one friction array in a shift clutch, or if in a transmission several shift clutches are arranged next to one another in axial direction, then the overall length is significantly affected. In this connection, due to the friction couples, energy losses will arise. A further disadvantage of a lock synchronization containing friction cones is their high susceptibility to radial displacement within the cones.

OBJECT OF THE INVENTION

It is therefore the object of this invention to minimize or avoid, in a locking synchronization, the disadvantages due to large axial actuating clearance, the high losses of energy, and the susceptibility to radial displacement between the friction surfaces of a friction device.

SUMMARY OF THE INVENTION

This object is accomplished with a system wherein a gear, i.e. a friction surface or surfaces, are connected rotationally to the gear only when being actuated, and are freely movable when in neutral or engaged position.

While in the art the friction surfaces of a friction array are rotatably connected either to the synchronizing body or the gear, even when the shift clutch concerned is in neutral, according to this invention, the rotary connection of the friction surface which is coordinated to the gear is interrupted in the neutral and the engaged position. Thus, engagement play between the friction surfaces can be omitted entirely, and energy losses due to relative motion of the friction surfaces cannot arise. Due to this arrangement, shifting distances are shorter. The disengagement of the friction surface coordinated to the gear from the former allows radial displacement without deleterious effect.

Advantageously a friction ring which is freely movable when in neutral position, is rotationally connected in actuated position to the gear via face gearing.

A friction ring with two friction surfaces can be disposed between two synchronizing rings each of which is provided with a respective friction surface. A return device can be provided which in the neutral position holds a friction ring in the axially inner position either directly or via the synchronizing rings and returns it into this position after firm coupling has taken place.

The return device can be a spring. The return device can be disposed in the face gearing and can effect the return by means of appropriate configuration of the gear flanks. The face gearing between the gear or a coupling body respectively and the friction ring has a large amount of play both in radial and circumferential direction.

The device can constitute a double shift coupling, characterized by the fact that coordinated to each shift coupling are coordinated two synchronizing rings lying radially on top of one another, with each having a friction surface, which between them is arrayed with one friction ring with two friction surfaces and one set of face gearing facing toward the appropriate gear, and that the radially outer synchronizing ring has blocking teeth which cooperate with the internal teeth of the sliding sleeve, that on each gear is placed, fixed axially as well as in rotation, a coupling body, which in addition to the known coupling gearing carries axially inward oriented face gearing, where the cooperating face gears on the coupling body and the friction ring provide play radially as well as in circumferential direction, which promotes especially at initiation of a shift the meshing of the teeth of the friction ring with tooth gaps of the coupling body, and which does not obstruct a radial motion for the purpose of equalization of the load, and that the two radially internally disposed synchronizing rings are connected with one another by means of a spring.

Each shift coupling has coordinated therewith one synchronizing ring and one friction ring with one friction surface each. The friction ring is provided with face gearing oriented towards the gear, cooperates with face gearing on a coupling body connected to the gear. The face gearings exhibit play radially as well as in circumferential direction, which promotes especially at initiation of a shift the meshing of the teeth of the friction ring with the tooth gaps of the coupling body.

The friction ring and the synchronizing ring are moved back into neutral position via the face gearing which is provided with deflection slopes which cooperate with tooth flanks on the teeth of the friction ring. The blocking surfaces are disposed in the sliding sleeve and cooperate with the locking and pressure pin.

If the face gearing on the friction ring, which has at least one friction surface coordinated with the gear, and the face gearing on the gear or the coupling sleeve is constructed in an appropriate manner, then a radial displacement is possible without deleterious effects even during the coupling function, so that this type of synchronization is particularly suited to drives with several counter shafts, and split torque paths.

The realization of the blocking synchronization according to this invention is particularly well suited for an enlargement of the friction surfaces by provision of several friction arrays because the friction ring carries friction surfaces on both sides, and a simple second synchronizing ring must be provided. Operation can be further improved by providing return devices for the friction ring because an undesired coupling of the friction ring with the gear in the idle and shifted-in position can be prevented with certainty by these means even in the presence of vibrations.

The principle of this invention the friction surfaces, which otherwise are solidly connected to the gear or the coupling sleeve, are connected only during the operation of attaining of synchronization via face gearing, and are disconnected in the neutral and shifted-in position, can be applied to all other blocking synchronizing systems. For example in a system with blocking surfaces which are arrayed on synchronizing rings and are effective in circumferential direction and thereby cooperate with blocking bodies which are only radially movable and swing in axial direction.

BRIEF DESCRIPTION OF THE DRAWING

Further details of the invention are explained by means of examples of embodiments and by means of drawing, where the details of the drawing are the subject matter of the invention.

FIG. 1 shares a double shift coupling in section, each coupling provided with two friction arrays and blocking synchronization equipped with blocking teeth.

FIG. 2 is a partially displaced cylindrical section II—II according to FIG. 1.

FIG. 3 is a detail of FIG. 1 in the area of the driving and return spring.

SPECIFIC DESCRIPTION

Figure 4:
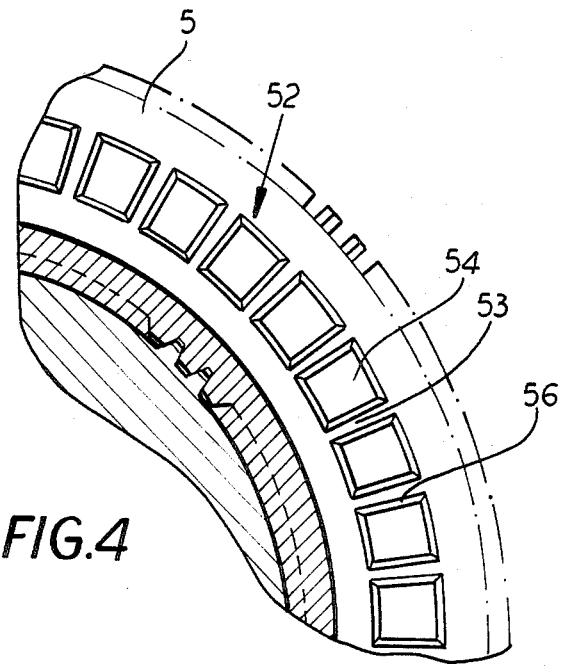
FIG. 4 is a partial view in the direction of the face gearing in the coupling body.

FIG. 1 shows a partial section through a double shift coupling with a synchronizing body 2 solidly connected to drive shaft 1, the synchronizing body carrying in known fashion a sliding sleeve 3 which is movable in axial direction. On both sides of the synchronizing body 2 are gears 4, journaled rotatably on drive shaft 1 and equipped with transmission spur gearing 41. On coupling bodies 5, which are connected in known manner to gears 4, are arrayed the coupling or clutch gearing 51 which cooperates with the gearing 31 of sliding sleeve 3, and face gearing 52. Further, in synchronizing body 2 is arrayed pressure pin 6 movable radially and, which in neutral position is urged by spring pressure into a cavity 32 in sliding sleeve 3.

Between coupling body 5 and synchronizing body 2, and connected to the latter with circumferential play, is arrayed in known manner in axial direction a first synchronizing ring 7, which also has blocking teeth 71. In the same axial plane is arrayed, radially toward the center a second synchronizing ring 8, connected with circumferential play to synchronizing body 2. A freely movable friction ring 9 between the two synchronizing rings 7, 8 has, in addition to the two friction surfaces 91 arrayed in radial direction, facing toward coupling body 5 face gearing 92 with narrow teeth 93 and wide tooth gaps 94 (FIG. 2). The thickness of the friction ring 9 and thus the width of the face gearing 92 is chosen with respect to face gearing 52 on coupling body 5 such that a radial displacement between gear 4 and friction ring 9 is possible.

FIG. 2 shows in particular the narrow teeth 93, 53 of the friction ring 9 as well of the face gearing 52 on the coupling body 5, and the wide tooth gaps 94, 54 on these face gears.

The second synchronizing rings 8 arrayed radially inwards are preferably connected with one another in the area of the dogs 81 via a spring 83 (FIG. 3).

A possible configuration of the face gearing 52 on coupling body 5 with teeth 53 and tooth gaps 54 can be seen in FIG. 4 in conjunction with FIG. 2. The deflection slopes 56 also shown in FIG. 4 effect the movement of friction ring 9 toward the neutral position when the synchronization action is completed.

The blocking synchronization operates as follows:

In the neutral position of the shift coupling, as shown in FIG. 1, the pressure pin 6 is held in central position by cavity 32 of sliding sleeve 3. The face gearing 52, 92 of coupling body 5 and friction ring 9 is not in mesh, and the freely movable friction ring 9 is in the axially inner position. The two friction arrays between friction ring 9 and the two synchronizing rings 7, 8 cause the friction ring to move with them, so that it runs at the speed and in the direction of synchronizing body 2. By displacement of sliding sleeve 3, which is effected in a known manner, e.g. via shifter forks, to the right, the pressure pin 6 is also moved to the right, and it presses against synchronizing ring 7, so that this as well as the friction ring 9 and the second synchronizing ring 8 are likewise moved towards coupling body 5. The teeth 93 on friction ring 9 then mesh with the tooth gaps 54 of the coupling body which rotates at a different speed, which (engagement) is facilitated by appropriate formation of the face gearing. While the depth of engagement is still small, the friction pairing between the radially outer synchronizing ring 7 and the friction ring 9 becomes effective in a prevalent manner, so that when there is a difference in speed of rotation between synchronizing body 2 and gear 4, the former is turned into one of the end positions. The blocking gearing 71 prevents in a known manner the further axial movement of the sliding sleeve 3 by having its pressure surfaces engage surfaces of the gearing 3' thereof. Due to the small mass of the friction ring 9 and the relatively loose frictional connection with the synchronizing rings 7, 8 during the engagement process, and the configuration of the face gearing 52, 92, in priority over the ratio of tooth thickness to tooth gap in conjunction with the tooth configuration, the connection of friction ring 9 with coupling body 5 occurs in a simple manner. It is only now that the outward facing surface 84 of the second synchronizing ring 8 comes in contact with coupling body 5. Upon synchronization, which is attained via the two friction arrays between friction ring 9 and the two synchronizing rings 7, 8 when further action of sliding sleeve 3 via blocking gearing 71 and pressure pin 6 occurs, deblocking becomes effective and the sliding sleeve 3 couples the synchronizing body 2 and coupling body 5 and therewith the corresponding gear 4 via coupling gearing 51 in a solid manner. Since no further axial pressure acts upon synchronizing ring 7, the latter as well as friction ring 9 are returned to their initial positions by means of spring 82 which for example may be arrayed on the second synchronizing ring 8, so that the friction ring 9 is disengaged from the face gearing 52 of the coupling body 5. This return movement may also be effected by the deflection slopes 56 of face gearing 52 on coupling body 5.

Figure 5:
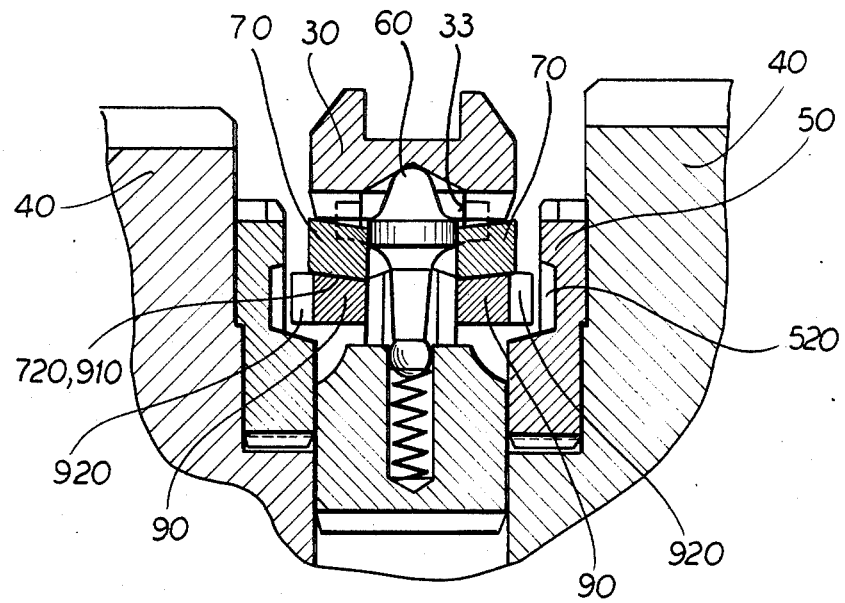
FIG. 5 is a detail section of a double shift coupling according to FIG. 1, but with only one friction array and with blocking surfaces in the sliding sleeve.

As opposed to FIG. 1, FIG. 5 has only one friction array—friction surfaces 720, 910—and the blocking surfaces 33 are arranged in known manner in the sliding sleeve 30 and cooperate with a pressure and locking bolt 60. In place of the spring which serves to retain and return the synchronizing rings and the friction ring, the face gearing 52 on the coupling body is only provided with deflection slopes 56 (FIG. 4), which upon cessation of the shifting pressure push away friction ring 90, so that it moves out of mesh. Otherwise the action is the same as already described in conjunction with FIGS. 1 to 4.

The invention is not solely restricted to the examples of embodiment, thus combinations of the examples of embodiment are also possible, e.g. with respect to the number of synchronizing rings provided and the blocking rings emplaced in each case. The invention is also applicable where the blocking surface cooperate with a locking pin, and are disposed on the synchronizing ring.

We claim:
1. A lock synchronizer for a gear shift, comprising:
a shaft rotatable about an axis;
a gear rotatable about said axis relative to said shaft;
a synchronizing body entrained with said shaft and positioned next to said gear;
a sliding sleeve surrounding said synchronizing body and formed with internal coupling teeth axially engageable with external coupling teeth provided on said gear;
a plurality of pressure pins between said synchronizing body and said sliding sleeve for coupling said synchronizing body to said sliding sleeve, said pins being braced resiliently between said sleeve and said body with generally radial pressure and being tiltable in a direction of said axis upon shifting of said sliding sleeve from a neutral position in which said internal coupling teeth of said sleeve are out of engagement with said external coupling teeth provided on said gear into an intermediate position wherein said internal coupling teeth approach but do not engage said external coupling teeth, said sleeve being shiftable axially relative to said pins beyond said intermediate position into a fully coupled position in which internal coupling teeth of said sleeve are in engagement with said external coupling teeth provided on said gear;
at least one synchronizing ring traversed by and displaceable with said pins located between said sleeve and said body, said synchronizing ring having blocking teeth frictionally engageable laterally with said internal coupling teeth of said sleeve while said sleeve and said gear rotate at different speeds to retain said sleeve against displacement from said intermediate position into said fully coupled position as long as said sleeve and said gear rotate at different speeds, said frictional engagement of said blocking teeth relaxing when said sleeve and said gear rotate at the same speed to permit displacement of said sleeve into said fully coupled position; and
a friction ring surrounding said body inwardly of said sleeve and frictionally engaging said synchronizing ring while being freely displaceable relative to said body and said pins at least limitedly, said friction ring having face gearing engageable with face gearing coupled to said gear so that said friction ring is connected rotationally to said gear only when said face gearings are engaged and said friction ring is free to rotate relative to said body both in said neutral position and in said fully coupled positions of said sleeve.

2. The lock synchronizer defined in claim 1 wherein said friction ring and said synchronizing ring are in frictional engagement along frustoconical surfaces tending to shift said friction ring axially into a position in which said face gearing of said friction ring is retracted from said face gearing coupled to said gear.

3. The lock synchronizer defined in claim 1 wherein two synchronizing rings are provided and said friction ring is sandwiched between said synchronizing rings, each of said synchronizing rings having frustoconical surfaces cooperating with frustoconical surfaces of said friction ring tending to position said friction ring in its position assumed in said neutral position of said sleeve.

4. The lock synchronizer defined in claim 3, further comprising a spring acting upon said friction ring for biasing same out of engagement with said gear.

5. The lock synchronizer defined in claim 3 wherein said face gearings have gear flanks oriented so as to urge said friction ring away from said gear.

6. The lock synchronizer defined in claim 3, further comprising another gear disposed on an opposite side of said synchronizing body from the first-mentioned gear and provided with a respective array of external coupling teeth engageable with the internal coupling teeth of said sliding sleeve, said other gear being formed with face gearing engageable with face gearing on said friction ring on a side thereof opposite the face gearing engageable with said first-mentioned gear, said synchronizing ring having respective arrays of said blocking teeth on opposite axial sides thereof for frictional engagement with said internal coupling teeth upon displacement of said sleeve toward the respective one of said gears.

* * * * *